G. Page.
Drill Stock.
Nº 730.
Patented May 8, 1838.
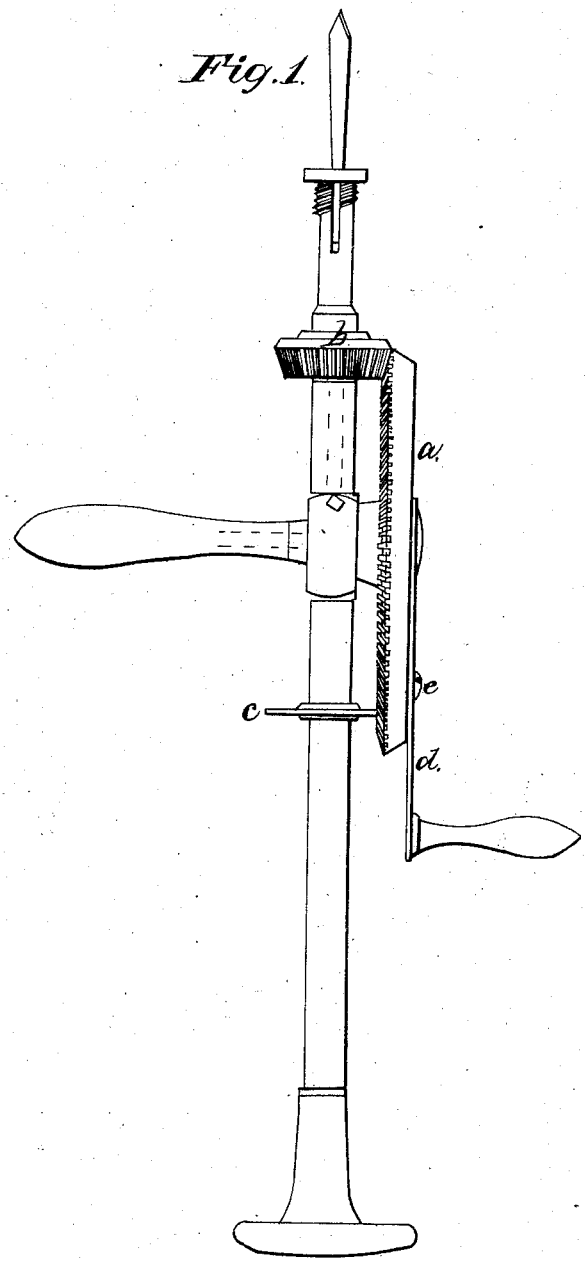
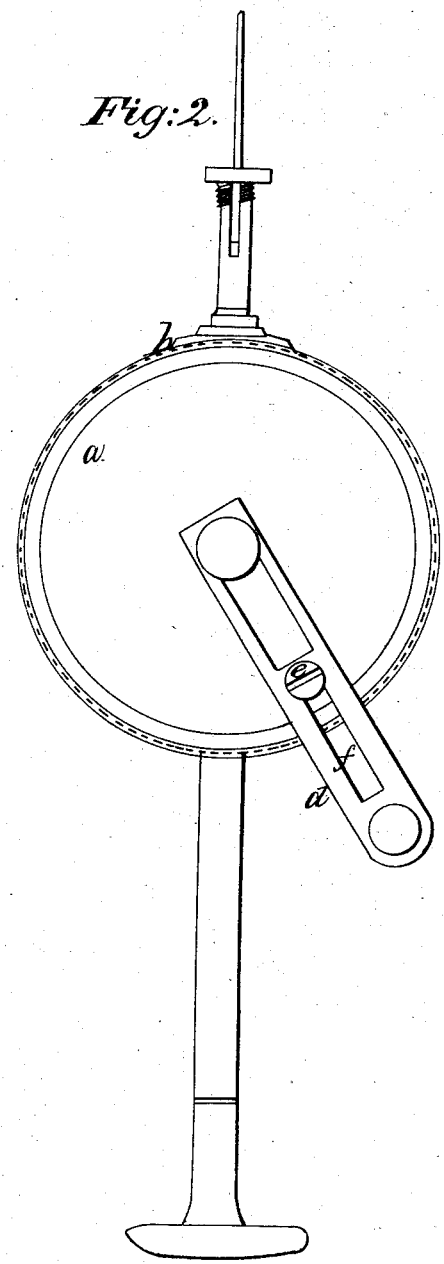

UNITED STATES PATENT OFFICE.

GEORGE PAGE, OF KEENE, NEW HAMPSHIRE.

GEARED DRILL-STOCK.

Specification of Letters Patent No. 730, dated May 8, 1838.

*To all whom it may concern:*

Be it known that I, GEORGE PAGE, of Keene, in the county of Cheshire and State of New Hampshire, have made an Improvement in Geared Drill-Stocks; and I do hereby declare that the following is a full and exact description thereof.

In the accompanying drawing Figure 1, is a side, and Fig. 2, a back view of the instrument.

The gearing of the main wheel $a$, into the pinion $b$, is the same as has been heretofore employed; but the bearing of the main wheel has been entirely on its axle, causing it to work less pleasantly, and to wear out more rapidly, than when made in my improved way, with a friction roller $c$, bearing upon the smooth face of the main, or driving, wheel $a$, which friction roller revolves freely upon the shank of the drill stock.

In order to change the velocity, and also to enable me to work the drill in places into which the stock might not otherwise pass, I make the winch $d$, by which the main wheel is turned, adjustable, sliding it in or out, and securing it in place by means of the screw $e$; the slot $f$, allowing the handle to come close up to the periphery of the driving wheel.

What I claim as my invention, and wish to secure by Letters Patent, is—

The manner in which I have combined the friction wheel with the working gear of the drill stock, for the purpose set forth.

GEORGE PAGE.

Witnesses:
C. H. DILTBERGER,
LINTON THORN.